Warth, Hufeland & Braun,
Varnishing Lead Pencils.
No. 102,893. Patented May 10, 1870.

Witnesses:
C. Wahlers.
E. F. Kastenhuber

Inventors.
Albin Warth
Philip Hufeland
George Braun.
By VanSantvoord & Hauff,
their Atty Warth, Hufeland & Braun,
Varnishing Lead Pencils.
No. 102,893. Patented May 10, 1870.

Witnesses:
C. Wahlers
E. F. Kastenhuber

Inventors
Albin Warth
Philip Hufeland
Georg Braun
By Van Santvoord & Hauff
their Atty.

United States Patent Office.

ALBIN WARTH, OF STAPLETON, AND PHILIPP HUFELAND AND GEORG BRAUN, OF NEW YORK, N. Y., ASSIGNORS TO EBERHARD FABER, OF NEW YORK CITY.

Letters Patent No. 102,893, dated May 10, 1870.

MACHINE FOR VARNISHING PENCILS, &c.

The Schedule referred to in these Letters Patent and making part of the same.

*To all whom it may concern:*

Be it known that we, ALBIN WARTH, of Stapleton, in the county of Richmond, and PHILIPP HUFELAND and GEORG BRAUN, both of the city and county of New York, all of the State of New York, have invented a new and improved Machine for Varnishing Pencils; and we do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
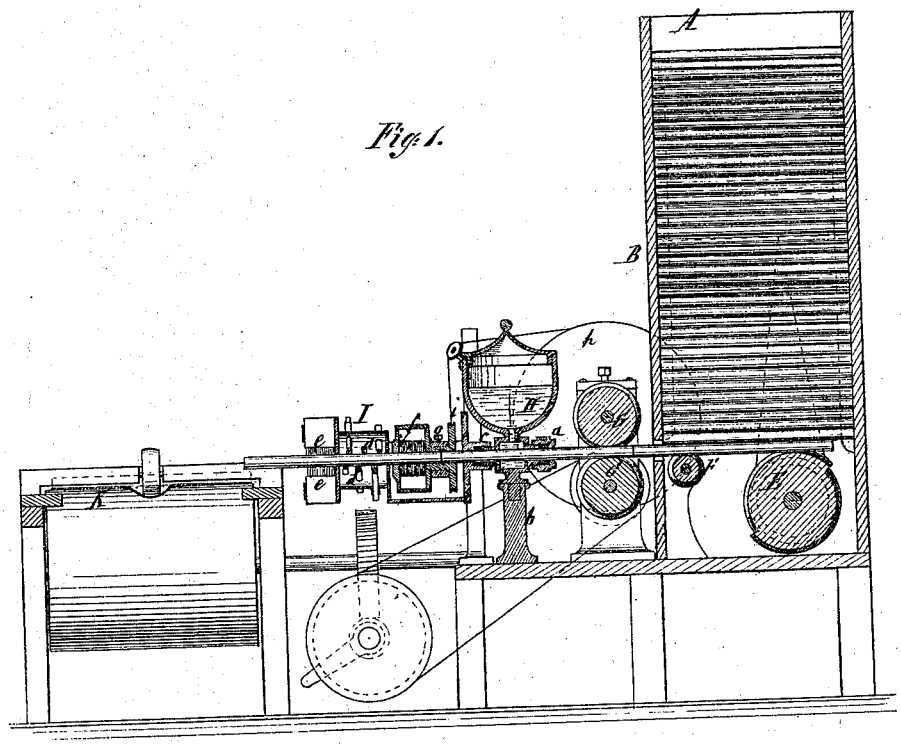
Figure 1 represents a longitudinal section of this invention.

This invention relates to a machine in which the pencils to be varnished are automatically fed down through a hopper of peculiar construction, in the lower part of which revolves a cam-roller which crowds one pencil after the other out and between feed-rollers, by the action of which the pencils are made to pass through a reservoir containing varnish, and thence through a head containing a series of brushes, partly stationary and partly revolving, by the action of which the varnish is pressed uniformly into the surface of the pencils, all surplus varnish being removed, so that the pencils on leaving the brush-head can be dropped on a moving endless apron, on which they are allowed to remain until they are sufficiently dry to be handled without injury to the varnish.

In the drawing—

The letter A designates a hopper of sufficient size to receive a large quantity of pencils.

Figure 3:
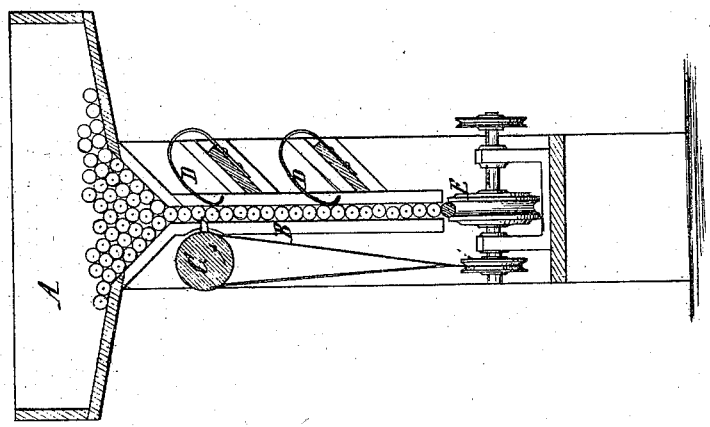
Figure 3 is a transverse vertical section of the same.

The bottom of this hopper is inclined so that the pencils resting therein roll down into a vertical channel, B, which is just wide enough to allow of the passage of one pencil, and in which the pencils arrange themselves one on the top of the other, as shown in figs. 1 and 3 of the drawing.

While passing down through the channel B, the pencils are exposed to the action of an agitator, C, which consists of a roller provided with projecting toes, and receiving a revolving motion in the direction of the arrow marked thereon in fig. 3, so that the toes sweep past the pencils and raise them up and then allow them to drop, whereby the superincumbent mass of pencils is agitated and the pencils are caused to pass down from the hopper into the channel without fail.

While passing down through the channel, the pencils are exposed to the action of friction-springs D, which prevent them from becoming misplaced, and from clogging up said channel.

The channel B is open at its bottom end and under it is placed a guide-roller, F, and a cam-shaped roller, E, with a grooved face lined with India rubber or other suitable material capable of producing the required friction on the pencils resting thereon.

This cam-shaped roller receives a slow revolving motion, and, as it turns, it allows one pencil after the other to drop down in line with the guide-roller F, and with the feed-rollers G, which are situated outside the hopper, as shown in fig. 1, the remaining pencils in the channel being supported by one of the cams of the cam-roller, and, by the friction of the grooved face of the cam-shaped roller, the pencil resting thereon and on the guide-roller, is crowded toward the feed-rollers, so that said feed-rollers take hold of it and force it through the stuffing-box *a* into the reservoir H containing varnish, said feed-roller being covered with India rubber or other soft and elastic material, so that they are capable of taking a firm hold of the pencils without injuring their surfaces.

In this operation it is important that the cam-roller acts on the pencils simply by friction, so that said pencils are free to slip on the face of the cam-roller, and that they are not delivered any faster than required by the feed-rollers.

The reservoir H is supported by a column, *b*, rising from the bed of the machine, and it is provided with a stuffing-box, *a*, through which the pencils are introduced, as above stated, and with another stuffing-box, *c*, through which the pencils pass out, as shown in fig. 1 of the drawing, the pencils themselves acting as plugs, whereby the escape of the varnish from the reservoir is prevented, and the feed-rollers being arranged at such a distance from the receiving stuffing-box *a*, that one or two of the pencils always remain in such a position that the stuffing-boxes are stopped up, as will be readily understood by referring to fig. 1 of the drawing.

While passing through the reservoir H, each pencil is coated with varnish, and on leaving the stuffing-box *c* of said reservoir the pencil passes through a brush-head, I, which is secured to the end of the stuffing-box, and which carries a series of brushes, *d*, and another series of brushes, *e*, the brushes *d* being secured in radiating tubes, and the brushes *e* being fastened in radiating guides, so that all the brushes can be made to bear with a uniform pressure on the surface of the pencil passing through between them, and that by the action of said brushes the varnish is pressed into the pencil and all surplus varnish is removed, an operation which is essentially necessary, since if the varnish is not pressed into the surface of the pencil it is liable to scale off, and if the coat of varnish covering the pencil is not of uniform thickness, it is liable to crack.

Figure 2:
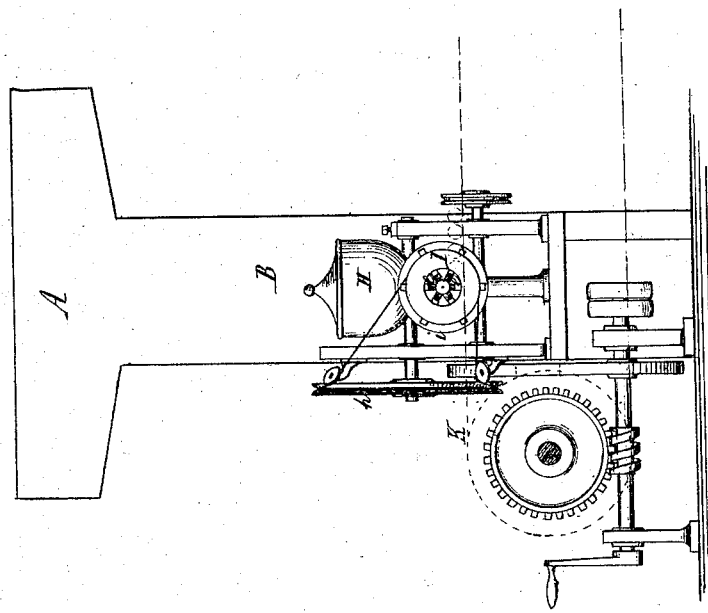
Figure 2 is an end view of the same.

With the stationary radiating brushes *d e* is also combined a revolving brush, f, which has its bearings in a journal-box, g, secured to the plate supporting the brush-head, and to which a rapid revolving motion is imparted by a belt passing over pulleys h i, as shown in figs. 1 and 2. By this revolving brush the varnish is uniformly divided over the surface of the pencil and the pencil is left in a more perfect condition than it is if the revolving brush is omitted and the pencil simply passed through the stationary brushes.

After having passed through the brush-head, the pencils are discharged upon an endless apron, K, which is stretched over drums placed at a considerable distance apart, and which advances slowly, so that the pencils, after having been carried along on the apron for a certain distance, are sufficiently dry to be handled without injuring the varnished surface.

By these means the operation of varnishing pencils can be performed entirely automatically, and much labor and expense are saved.

What we claim as new, and desire to secure by Letters Patent, is—

1. The mechanism substantially as herein described for varnishing pencils, composed of a hopper, a feed-channel, a cam-shaped roller, feed-rollers, a reservoir containing varnish, and a brush-head, all as set forth.

2. The combination of the agitator, constructed as described, with the hopper and feed-channel.

3. The friction surface on the cam-shaped roller, substantially as and for the purpose described.

4. The revolving brush in the brush-head, substantially as and for the purpose described.

5. The brush-head I, carrying a series of brushes d and e, the former secured in radiating tubes, the latter fastened to the radiating guides, substantially as and for the purpose herein specified.

6. The endless apron in combination with the varnishing mechanism, constructed substantially as and for the purpose described.

This specification signed by us this 14th day of March, 1870.

ALBIN WARTH.
PH. HUFELAND.
GEORG BRAUN.

Witnesses:
W. HAUFF,
E. F. KASTENHUBER.